Oct. 13, 1970  G. R. BANGE  3,534,148
ENCAPSULATED ELECTRICAL CIRCUIT AND TERMINALS
AND METHOD OF MAKING THE SAME
Filed Feb. 11, 1969  2 Sheets-Sheet 1

INVENTOR.
GLENN R. BANGE
BY
ATTORNEYS

Oct. 13, 1970
G. R. BANGE
3,534,148
ENCAPSULATED ELECTRICAL CIRCUIT AND TERMINALS
AND METHOD OF MAKING THE SAME
Filed Feb. 11, 1969
2 Sheets-Sheet 2
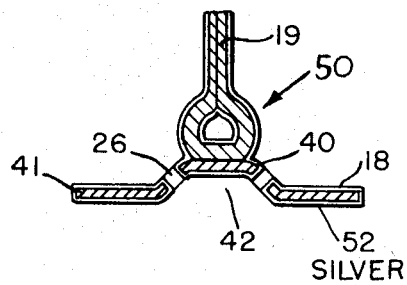
FIG. 9
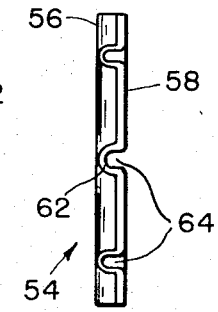
FIG. 10
FIG. 11
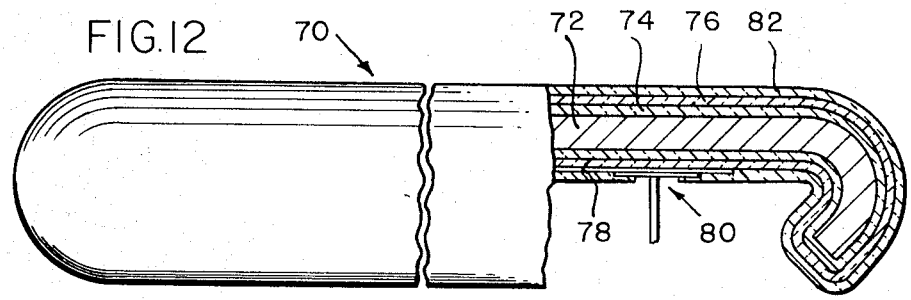
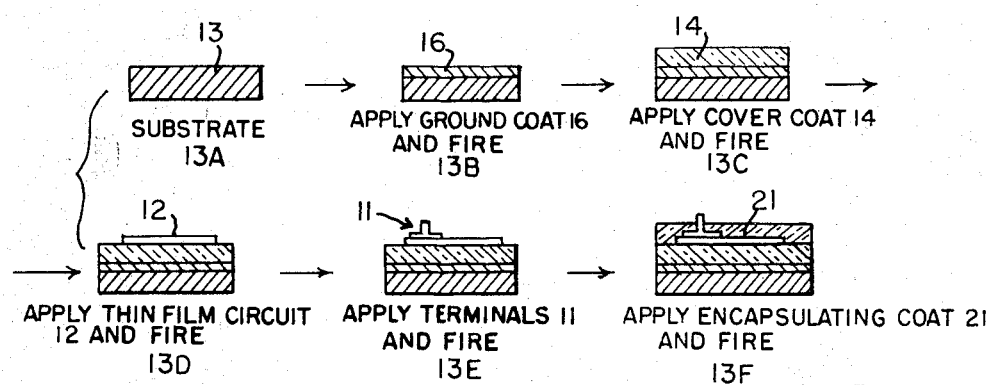
(FLOW SHEET OF METHOD)
FIG. 13
INVENTOR.
GLENN R. BANGE
BY Thomson & Colour
ATTORNEY United States Patent Office 3,534,148
Patented Oct. 13, 1970

3,534,148
ENCAPSULATED ELECTRICAL CIRCUIT AND TERMINALS AND METHOD OF MAKING THE SAME
Glenn R. Bange, Pittsford, N.Y., assignor to Sybron Corporation, Rochester, N.Y., a corporation of New York
Continuation-in-part of application Ser. No. 564,490, June 30, 1966. This application Feb. 11, 1969, Ser. No. 801,239
Int. Cl. H05k 1/10
U.S. Cl. 174—68.5          31 Claims

ABSTRACT OF THE DISCLOSURE

Electrical terminals connected to a circuit which is to be encapsulated in a thin glass layer are prevented from sinking in the layer during fusing of the glass by forming the terminal in such a configuration that it will float in the fluid glass. To prevent any gas generated during the fusing from moving the terminal or the circuit through the fluid glass the terminal can be perforated and dome-shaped to allow any such gas to expand and escape.

CROSS-REFERENCES TO RELATED APPLICATIONS

This application is a continuation-in-part of my copending application Ser. No. 564,490, filed June 30, 1966, now abandoned, which in turn was a continuation-in-part of the parent application, Ser. No. 479,243, filed Aug. 12, 1965, also abandoned.

BACKGROUND OF THE INVENTION

Field of the invention

This invention relates to electrical terminals for use in connection with an electric circuit encapsulated within a dielectric material.

Description of the prior art

Conventional methods of connecting electrical terminals to the encapsulated circuit are not suitable for use with thin conductive film circuits because of the fragility of the circuit and, in fact, conventional terminals cannot be used. Low temperature solder would melt at the operating temperature of the device; high temperature solder cannot be encapsulated; mechanical connections such as bolts result in leaving interstices in the glass and because of having to pass through the base would result in corrosion and wearing of parts ultimately resulting in increased electrical resistance.

While, as previously mentioned, it is old to encapsulate electrical circuits and terminals, including printed conductive films in materials such as polyurethane resins, the encapsulation of such circuits and terminals within glass or glass-ceramic compositions has many advantages. Moreover, the application or bonding of the encapsulating glass to a relatively strong rigid substrate has many advantages in the production of units such as those mentioned above. However, the glass or use of glass-ceramic compositions and the bonding of the glass to the metal substrate introduces many problems.

SUMMARY OF THE PRESENT INVENTION

The terminals of this invention and their application to and in conductive relation with an electrical circuit may have application wherever a circuit is encapsulated within a dielectric medium. For example, the terminals of this invention may be employed in connection with capacitor or inductance circuits. The terminals and method of this invention have been more particularly developed for use in connection with heating devices wherein the circuit is a resistance circuit encapsulated wthin glass or glass-ceramic dielectric materials.

The encapsulating medium and the glass encapsulated circuit, together with its terminals, are preferably applied or bonded to a substrate to give strength and rigidity to the assembly. While certain ceramic materials may be employed as the substrate in connection with the production of certain end products, I contemplate primarily the application of the circuit to a metal substrate. While other metals, such as aluminum may be used as the substrate as will be later discussed, I believe the invention has its widest application where the substrate is mild sheet steel. The completed assembly with proper selected electrical characteristics may be used in connection with the production of space heaters or heaters for special industrial and other purposes, electrical appliances such as toasters, frying pans, coffee pots, warming ovens, trays and many other devices of a similar nature.

While broadly the invention may be applied to circuits other than printed conductive film circuits, such film circuits have a great many advantages not necessary to enumerate herein and have come into widespread usage. These films are very thin but will not withstand physical abuse or arcing without either damage to, or destruction of, the circuit. Consequently, thin film printed circuits, for the purpose of protecting the circuit, are commonly encapsulated within a protective material such as organic resins or foams such as polyurethane. Most commonly, of course, these encapsulating mediums have dielectric properties, the effectiveness of which depend upon the dielectric material used.

An object of this invention is to provide novel terminals and method of making the same and connecting them to a circuit, particularly a thin film circuit, encapsulated in a dielectric protective medium, particularly a medium of glass or glass-ceramic composition.

Another object of this invention is to provide novel terminals and a method of making the same, each termianl comprising a disc or wafer and a terminal post or stem in electrical contact with the disc and extending outward from the disc in a position to receive a conductor when the disc is embedded in a dielectric glass and in electrical contact with a printed resistance circuit.

A further object of this invention is to provide a composite terminal for use with a circuit encapsulated in a dielectric medium particularly glass or glass-ceramic matrices enamelled over metal substrates.

Another object of this invention is to provide terminals which will retain direct electrical contact integrity with a printed circuit when a glass encapsulating material is fired at temperatures approximately from 1550–1750° F.

Still another object of my invention is to provide a terminal disc so constructed and arranged that it may be cemented to a printed circuit applied on a glass surface and fired into intimate circuit contact with the printed circuit without causing a large bubble to form beneath the disc and without causing spalling of the glass when an encapsulating layer of glass is applied over the printed circuit and the terminal disc.

Another object of this invention is to provide a terminal that can be cemented to a thin film circuit with a cement mix identical to the composition used to make the conductive circuit.

Another object of this invention is to provide a chemically etched wafer to simplify the attaching of the terminal to the circuit.

Still another object of this invention is to provide a non-perforated, gas-venting wafer for a terminal.

More specifically, it is an object of this invention to provide a composite terminal and method of producing such a terminal for use in connection with a glass embedded resistance circuit, particularly a printed circuit wherein the glass is fused and crystallized in situ to embed or encapsulate the resistance circuit while simultaneously embedding a part of the terminal in electrical contact with the printed circuit, the terminal comprising a disc or wafer embedded part and a preferably flexible post part for the reception of a current conductor, the printed circuit and its terminals being carried by a substrate metal base to lend strength and rigidity to the assembly and the substrate metal being coated and electrically insulated from the printed circuit by a dielectric glass.

BRIEF DESCRIPTION OF THE DRAWINGS

Other objects and advantages of this invention will be particularly set forth in the claims and will be apparent from the following description, when taken in connection with the accompanying drawings, in which:

FIG. 9 is a cross-sectional view through an improved terminal;

FIG. 10 is a top plan view of another embodiment of a wafer;

FIG. 11 is a side view of the wafer of FIG. 10;

FIG. 12 is a side view with a portion broken away and in cross-section, through a preferred heater made according to the present invention; and FIG. 13 is a simplified flow sheet illustrating the sequence of method steps used in the prresent invention.

DETAILED DESCRIPTION OF THE PREFERRED EMBODIMENT

Figure 1:
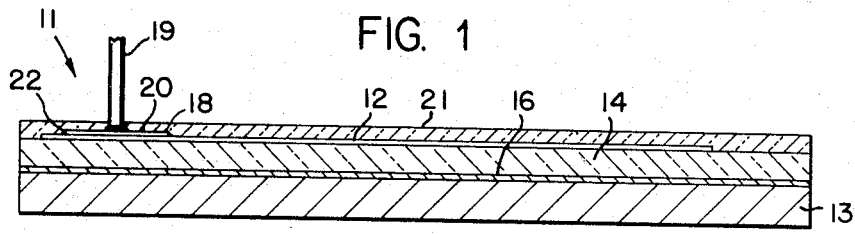
FIG. 1 is a sectional view showing a resistance heater having an encapsulated resistance circuit with the terminal of my invention in conducting relation with the resistance circuit and partially embedded in an encapsulating coating with the assembly bonded to a metal substrate.

Referring to FIG. 1, the terminal assembly or terminals of my invention, generally indicated by the numeral 11, is electrically connected to a circuit 12 embedded in glass, as will presently appear, carried by a metal substrate 13. Preferably the metal substrate is low carbon sheet steel. While alloys of steel may be used and other metals and their alloys may be employed, mild steel, having a thickness between $\frac{1}{16}''$ and $\frac{1}{8}''$, is the preferred substrate as the backing for the assembly in most cases. The substrate 13 metal should be preferably rigid and unyielding. If a soft metal or material other than metals are employed as a substrate, it should be a formable material of substantially rigid character adapted to maintain its shape under elevated temperatures. The assembly can then be subjected to relatively rough treatment when incorporated in, for example, a space heater or in cooking or heating utensils.

Mild sheet steel is also the preferred substrate metal because it is not distorted at the temperature at which the glass, when encapsulating the printed circuit 12, should be fired on the metal substrate 13. These temperatures range from 1550°–1750° F. The metal substrate 13 is preferably preformed to substantially the size and shape desired in the completed heating unit. Thus, for example, if a frying pan is to be manufactured, the metal substrate would be shaped or stamped substantially to the desired shape of the finished frying pan.

After conventional surface preparation of the sheet steel substrate, a cover coat 14 of dielectric glass is bonded to the metal substrate 13. The cover coat 14 may be bonded directly to the metal substrate 13, but in most instances it is desirable to interpose a ground coat 16 between the glass cover coat 14 and the metal substrate 13.

The cover coat 14 and the ground coat 16, if one is used, are fired on the metal substrate at from 1550°–1750° F.; 1600° F. being a good average value. These coatings should have a dielectric strength sufficient so that the completed heating unit may operate at temperatures up to 800° F. and preferably up to 1000° F. without undue electrical leakage. However, the application of this invention finds its largest field in units where the operating temperature is 400°–450° F. It is sufficient for purposes of this application to state that the cover coat 14 may be glass crystallized in situ as disclosed in application Ser. No. 40,610 filed July 5, 1960; abandoned in favor of continuation application Ser. No. 593,346, filed Nov. 10, 1966, and now U.S. Pat. No. 3,368,712; a glass crystallized by incorporating in the glass mix discrete particles as disclosed in Pat. No. 3,051,589; or other special dielectric glasses. Each of the cover coat 14 and the ground coat 16 have a thickness in the range of 4–7 mils and preferably in the range of 5–6 mils.

Figure 2:
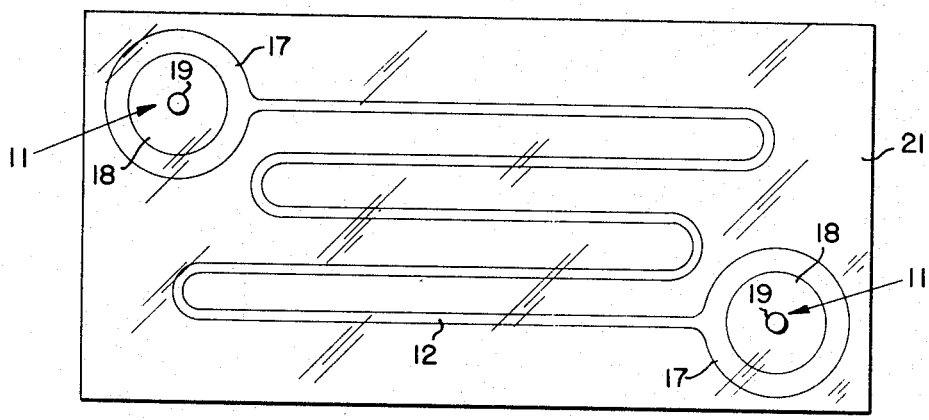
FIG. 2 is a top plan view of FIG. 1.

After the cover coat 14 has cooled or substantially solidified, the resistance circuit 12 is applied over the dielectric cover coat 14 in a circuit pattern as illustrated in FIG. 2. The circuit ends are then connected to the terminals 11 in a manner which will presently appear.

The circuit 12, shown in FIG. 2, is preferably a printed circuit. Such printed circuits are well-known in the art and are commonly used in the electronics field. They are made of finely ground metal particles particularly, for example, silver particles, a binding cement, and finely ground glass particles. The silver or conductor mix is available in a commercial form and is applied by silk screen process also well-known in the art. As stated above, the circuit 12 is very thin; the thin film circuits of this invention have a thickness in the range of .1–2 mils, and preferably in the range of .2–1½ mils; the preferred thickness is 0.6 mil. After the printed circuit has been applied to the cover coat 14, the entire assembly is fired at a temperature of between 1550–1750° F., preferably 1600° F. to fuse the silver printed circuit to the glass. This fusion of the circuit with the cover coat layer 14 causes the cover coat to be somewhat flowable and the silver circuit being somewhat higher in specific gravity than the glass causes the silver circuit to very slightly embed itself in the cover coat 14. During this firing period the printed circuit may be said to "float" on, or be buoyant with respect to the dielectric cover coat 14. The slight embedment of the printed circuit which may be only a few thousandths of an inch, aids in minimizing the wandering of particles of silver out of the circuit pattern.

At the ends of the circuit, as illustrated in FIG. 2 the circuit is enlarged in area to form substantial enlargements or "islands" 17 which may be generally circular to receive the bottom faces of the terminals 11. The purpose of the enlarged spots or "islands" of silver 17 is to provide an area for the reception of the discs 18 of the terminals. Good electrical contact is obtained between the discs and the enlarged areas 17.

The terminal 11 comprises the disc or wafer 18 and a post or stem 19. The two terminals 11 are placed on the ends or "islands" 17 of the printed circuit. The terminals 11 may be attached to the conductive film by cementing the discs or wafers 18 to the enlargements 17 of the circuit with conductive cement. The assembly is then fired and the volatile ingredients of the cement volatilize during firing and the remainder of the conductive cement is indicated by the numeral 22.

The encapsulating coat is then applied over the resistance circuit so that it preferably covers the wafers 18 of the terminals 11 and possibly the extreme lower ends of the stems or posts 19. The encapsulating layer 21 of glass is fused over the entire surface at a temperature of 1550° F.–1750° F., preferably at a temperature of approximately 1600° F. The encapsulating coat is a dielectric coating which may be of crystallized glass formed by crystallizing the glass in situ or by adding discrete particles to the glass mix as set forth above. The cover coat, during the firing of the encapsulating coating, becomes a soft viscous mass. However, the terminal discs and the printed circuit are submerged in the semi-fluid mass and the cover coat 14 and the encapsulating coat 21 tend to solidify as a unit as they cool, completely enclosing and sealing the printed circuit. It is not essential that the terminal discs be completely covered with glass, but it is essential that they be firmly anchored in electrical contact with the printed circuit and in the mass of glass against any accidental displacement. The encapsulating layer 21 has a thickness of 4–7 mils and preferably of 5–6 mils. Each of the layers 16, 13, and 21 preferably have a thickness of 6 mils. The overall thickness of the entire glass coating is in the range of 10–25 mils and is preferably about 18 mils.

Figure 3:
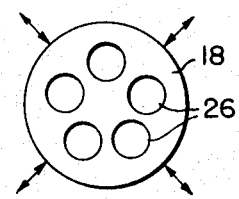
FIG. 3 is a top plan view of the terminal disc or wafer shown in FIGS. 1 and 2.

Referring now to FIG. 3, the disc or wafer 18 of the terminal 11 is circular in plan. The purpose of making the wafer 18 circular and extremely thin is that when the encapsulating layer 21 or glass is fired and later cooled, forces are set up between the wafer and the surrounding glass. To minimize these forces, the metal of the wafer should have a low coefficient of expansion. I have found "Inconel X" marketed by International Nickel Company suitable for my purposes, however, a preferred metal for use as the wafer is stainless steel 430. Regardless of the metal chosen, the metal will expand more rapidly when heated than the encapsulating glass and upon cooling will contract more rapidly. In FIG. 3 I have indicated by double ended arrows the direction of these forces. During the expansion of the metal of the wafer such expansion occurs radially outward. Thus the forces because of the circular congfiuration of the wafer, are exerted equally from all sides outward and inward from the axis of the wafer.

I have further found, as above mentioned, that it is desirable to make the disc or wafer 18 extremely thin in cross-section. I have found a disc five to ten thousandths of an inch in thickness suitable for my purposes. Indeed, I have experimented with discs as thin as three mils. Generally, the wafer should be as thin as it is possible to make it while still providing sufficient metal so that it is not distorted in normal handling. An extremely thin disc cuts down the forces generated by expansion and contraction of the disc. The wafer 18 is preferably 8 mils thick.

One of the problems encountered is that the terminal being heavier than the glass tends to sink during the last firing of the assembly. If it sinks sufficiently, it can engage the metal substrate and cause a short-circuit. In fact, if it sinks appreciably, although it may not engage the substrate, the proximity of the disc of the terminal to the substrate may result in sufficient current leakage to cause failure and destruction of the printed circuit. The wafer should therefore have as large an area as possible; should be thin; and the complete terminal should be as light in weight as possible. The terminal will then "float" on, or be "buoyant" with respect to the cover coat when the encapsulating coat is fired. This buoyancy may be aided by surface tension of the cover and its printed circuit. The temperature at which the encapsulating coat is fired is also important. It should be sufficient to render the cover coat viscously flowable but not sufficiently flowable to cause the terminal to rapidly sink during firing. Depending upon the glass mix, this range should be between 1550–1750° F., preferably about 1600° F. I have further found it desirable to weaken the discs for reasons later stated, as for example, by radially extending slots in the discs or by circular cutouts in the discs, as shown at 26. In FIG. 3 I have shown five circular cut-outs extending around the central axis of the disc although the number of cut-outs and the precise manner in which the discs are weakened is optional. The terminal 18 of FIG. 3 can have a total surface area (subtracting the area of the holes 26) of about 0.1 square inch and a weight of about 0.2 grams. The wafer 18 preferably has a diameter of about 0.4 inch and the holes 26 preferably have a diameter of about 3/32 inc.

The stem or post 19 is preferably made of twisted or braided conductive wire and should preferably yield when accidentally bumped. The strands of twisted wire are welded to the post or wafer, the weld 27 (FIG. 4) being continuous so that each wire is welded to the disc giving the effect of a multiplicity of welds. The wire and weld should be of metals which will not melt at the firing temperature of 1500–1750° F., and of course the wire should weld easily and firmly to Inconel X if that metal is used for the disc. Nickel has been found suitable for my purposes, but other metals such as silver would be suitable.

One of the problems encountered in the manufacture of a terminal for the purpose described, is that notwithstanding the fact that the crystallized glass is hard and highly resistant to mechanical forces such as a blow by a hammer, it, in common with all glasses which are subjected to expansion and contraction forces, has a tendency to chip, crack or craze. This tendency is magnified in the glass adjacent the terminal because of the unequal forces of expansion and contraction set up between the glass and the metal. When these forces are excessive, the terminal will "pop off" the glass. This "pop-off" problem is reduced to practical manufacturing limits by: using metals which have a low coefficient of expansion; using a wafer thin disc; and by weakening it so that it will yield when necessary during the firing and cooling cycle.

The terminal during firing may be said to "float" in the fused glass and while buoyant to a certain extent, its specific gravity is sufficiently greater than that of the glass so that it will maintain contact integrity with the "island" of the printed circuit. The encapsulating glass during firing flows over and embeds the terminal wafer and the lower part of the post and flows through the openings in the wafer effectively locking the terminal in the glass and in electrical contact with the printed circuit.

The encapsulating coat 21 should be as thin as possible to secure maximum heat transfer. Moreover, a thin layer is more resistant to thermal shock. An encapsulating layer in the range of four to five mils is desirable. Where a thermostat or other device is also encapsulated, a range in the area of eight to ten mils may be necessary.

Figure 4:
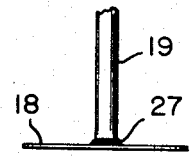
FIG. 4 is an elevational view of the terminal comprising the disc and the post welded to the disc.
Figure 5:
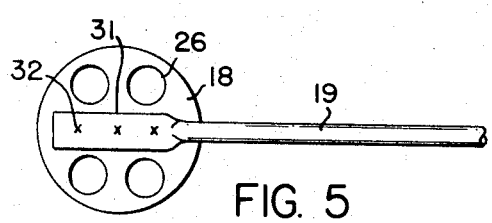
FIG. 5 is a top plan view of an alternative terminal and illustrating a method of making the alternative form of the invention.
Figure 6:
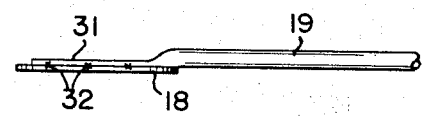
FIG. 6 is a side elevation of FIG. 5 prior to bending the post so that it extends substantially normal to the disc.

In FIGS. 5 and 6, I have shown a modification of the terminal in which the stem is one piece and preferably made of nickel rod or wire material. The nickel rod is flattened at 31 and welded, as indicated at 32, to the disc 18. After the weld has been made, the free end of the rod is bent upward substantially at right angles to the disc. The terminal of FIGS. 3 and 4 is preferred because the stem 19 is in effect multiple welded to the disc and because it is flexible and less likely to be damaged or damage the glass encapsulating coat if accidentally struck in assembly of the heating element in a unit or in shipment.

Figure 7:
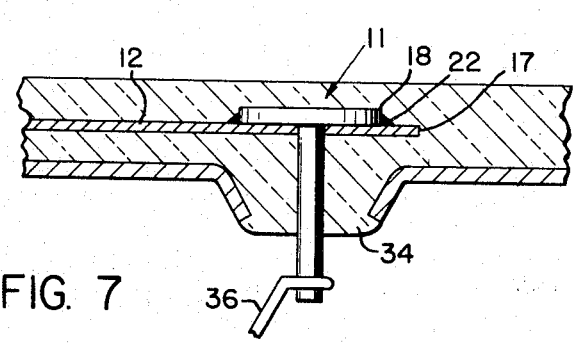
FIG. 7 is a view showing an alternative in which the post extends through the encapsulating glass layer and outward through an opening in the substrate metal.

In FIG. 7 I have shown a modification of the invention wherein the stem 19 of the terminal 11 projects through the "island" of the printed circuit and through an opening 34 in the metal substrate to receive the conductor 36. In some appliances such as a frying pan, it may be desirable to have the frying surface entirely of glass to enable easy cleaning and have the terminals project through the metal substrate.

Figure 8:
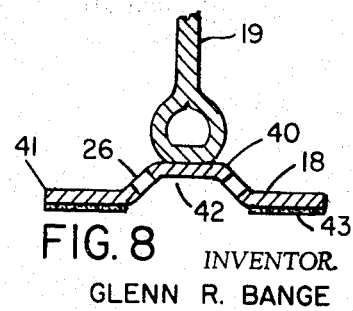
FIG. 8 is a view similar to FIG. 4 showing a crowned or domed disc which appears to eliminate or at least minimize certain causes of failure when a flat disc terminal such as shown in FIG. 4 is used.

In FIG. 8 I have shown a modified form and possibly preferred form of terminal disc. I have found that a percentage of heating units manufactured with a disc in accordance with FIG. 4, fail in service or upon testing. After considerable investigation, it appeared that a large bubble was forming beneath the disc during the firing of the unit to cement the terminal disc to the "island" 17 of the printed circuit. The cause of this bubble is not a certainty. It may be caused by gases released from the base metal bubbling upward through the cover coating 14 and collecting beneath the disc. However, more likely the bubble is formed by gases released during firing from the cement on the discs. Whatever may be the cause of the bubble, when a bubble of sufficient size was formed, it occasionally caused the island of the printed circuit to become depressed into the cover coat 14 either into contact with the base metal or sufficiently close thereto to cause excessive electrical leakage.

I have found that by doming or crowning the disc, as shown at 40, the failures are eliminated or at least minimized. When the disc 18 is crowned an annular ring 41 of metal is provided and this annular ring provides an air space 42 which is in communication with the holes 26. As before mentioned cement is applied to the bottom surface of the disc, as indicated at 43. In general an effort is made to apply the cement primarily to the annular ring 41 and minimize or eliminate the application of cement to the underside of the crowned part. Because the cement is applied in an annular ring either no bubble of sufficient size is formed to cause the failures above mentioned or because the gases may collect below the dome and escape through the holes 26 before application of the encapsulating coat 21, I found that failures due to a bubble of gas below the discs are eliminated or minimized.

In the previous discussion, I have been considering primarily mild steel as the base or substrate metal, and considering firing temperatures in the area of 1550–1750° F. Such temperatures are below the distortion point of the mild steel, although at the higher temperature of the range some distortion will occur. However, in connection with some products, I contemplate using a different substrate metal as, for example, aluminum. Aluminum has good conductivity characteristics and is relatively low in cost. However, it cannot be used with firing temperatures in the range above set forth. Aluminum has a melting point in the area of 1200° F. One of the possible uses of the terminal of my invention is in the production of space heaters where the heating surface is exposed, as for example, base board heaters for home heating. Where the heating element is exposed the temperature at the exposed surface should not exceed 180° F. In such heaters I contemplate using aluminum or one of its alloys and a glass having a much lower firing temperature, that is, below the distortion point of the substrate metal. For example, certain lead glasses, as is well-known in the art, crystallize readily at temperatures below the distortion point of aluminum and in a crystallized state have good dielectric characteristics. Lead glasses, depending upon the composition, have a firing temperature of from 1000–1400° F.

Referring now to FIG. 9, another feature of the present invention concerns the attachment of the terminal 11 to the circuit 12. The conductive cement described above is identical to the conductive silver mix used to form the circuit 12 except that some low temperature glass must be added to the cement mix to prevent the formation of an iron oxide layer, which layer would weaken the bond between the terminal 11 and the circuit 12. The additional low temperature glass added to the mix reacts chemically with the iron oxide, and the iron oxide goes into solution with the low temperature glass, as will be understood by one skilled in the art. This procedure requires the use of two different batches or supplies of silver paste. Because the two pastes are similar, there is the possibility that they could get mixed up and interchanged. Further, the manufacturing process could be simplified if a single paste could be used in both instances. The above problem has now been solved by using a terminal 50 which is identical to terminal 11 shown in FIG. 8 except that terminal 50 also includes a coating 52 of silver thereon. The coating 52 of silver preferably has a thickness of between about $\frac{1}{20}$–$\frac{3}{4}$ mil and preferably between about $\frac{1}{10}$–$\frac{1}{2}$ mil. The coating of silver is preferably achieved by silver plating. The silver coat 52 seals the iron out of the system and thus prevents the formation of a layer of iron oxide, which layer could weaken the bond. This improvement has the important advantage of allowing a single supply of silver paste to be used for both the circuit and the conductive cement. While it is only necessary to coat the wafer 18, the coating procedure is such that it is simple to plate the entire terminal 11. This improvement produces such a good bond that it is not necessary to have holes 26 in the wafer for the encapsulating coat 21 to flow through and into contact with the cover coat 14, although the holes 26 still perform the other functions of weakening the wafer 18 and of allowing gas bubbles generated between the wafer and the circuit to escape therefrom.

Another feature of the present invention concerns the use of chemical etching to manufacture the wafer 18. This produces a uniform flat wafer, as compared with other techniques such as the metal stamping technique which has been found to produce a turned-up lip at the edge. Although the lip is only about 2 mils high it is important that the terminal be installed "lip-up" to prevent the lip edge from coming to contact with the metal substrate 13. But even the up-turned lip causes problems in that it is sharp and it tends to cut through the glass encapsulating layer 21 and such can cause a break in the encapsulating layer. The chemical etching technique produces a flat edge and solves the above-mentioned problems.

Another embodiment of the present invention is the wafer 54 shown in FIGS. 10 and 11. Wafer 54 comprises a top surface 56, a bottom surface 58, a central flat area 60 to which a post 19 is to be welded, and a plurality of grooves 62 providing gas venting passages 64. When the wafer 54 is connected to a circuit 12 as described above, any gas generated therebetween is vented to a point beyond the wafer (i.e. to atmosphere) through passageways 64 formed by the grooves 62. Thus, for the purpose of venting gas produced between the wafer 18 and the circuit 12, either of the gas venting passageways 64 or 26, shown in FIGS. 12 and 8 respectively, can be used.

FIG. 12 shows a heating element 70 made according to the present invention and useful as a hot plate, for example. The element 70 comprises a substrate 72, a ground coat 74, a cover coat 76, a circuit 78, one terminal 80 and an encapsulating coat 82. During manufacture the element 70 is upsidedown, and a primary object of the present invention is to prevent the terminal 80 from sinking through coats 74 and 76 during subsequent firing operations during which coats 74 and 76 become soft and fluid.

FIG. 13 is a simplified flow sheet showing a method of making an electrical device comprising the steps of: (13A)—providing a substrate 13; (13B)—applying a ground coat 16 of glass-ceramic dielectric material to a surface of the substrate 13 and firing the assembly at about 1550° F. to 1750° F.; (13C) applying a cover coat 14 onto the ground coat 16 and firing the assembly at about 1550° F. to 1750° F.; (13D) applying a thin film electrically conductive circuit 12 to the cover coat 14, and firing the assembly at about 1550° F. to 1750° F.; said thin film electrically conductive circuit having a sufficiently large area and sufficiently small weight such that it will float on the cover coat 14 when the cover coat 14 is soft and semi-fluid, said cover coat 14 having the property of becoming soft and semi-fluid when fired at a temperature of about 1600° F.; (13E) connecting terminals 11 comprising a wafer and a post to said circuit and with said wafer in contact with said circuit by applying a quantity of a conductive paste between the wafer and said circuit, and firing the assembly at about 1550° F. to 1750° F.; and (13F) applying an encapsulating layer 21 of glass-ceramic dielectric material over and completely covering said circuit and at least partly covering said wafer. Any one of the above described terminals of the present invention can be used in the method illustrated in FIG. 13.

While I have shown and described the preferred form and method of my invention, it will be apparent that various modifications and changes may be made therein, particularly in the form and relation of parts and the steps of the method without departing from the spirit of my invention.

I claim:

1. An electrical device comprising in combination:
 (a) a layer of dielectric protective encapsulating medium;
 (b) a conductive circuit encapsulated within said layer;
 (c) a terminal in electrical contact with said circuit and comprising a wafer in contact with said circuit and a post connected to said wafer and extending beyond the outer surface of said layer, said wafer being at least partly embedded in said layer, and
 (d) said wafer having such configuration and properties as to prevent at least one of said terminal and said circuit from moving through said layer when said layer is in a fluid state, said wafer having a raised dome portion, said portion having a plurality of apertures extending therethrough whereby any gas generated between said wafer and said circuit can freely expand and escape from between said wafer and said circuit.

2. An electrical device comprising in combination:
 (a) a support;
 (b) a cover coat of dielectric material in contact with a surface of said support;
 (c) a thin film conductive circuit in contact with a surface of said cover coat;
 (d) a terminal connected to said circuit and comprising a wafer and a post connected to said wafer, with said wafer being in contact with said conduit and said wafer having such configuration and properties as to prevent at least one of said terminal and said circuit from moving through said cover coat when said cover coat is in a fluid state, said wafer including a centrally located raised dome portion having a plurality of apertures therethrough whereby any gas existing between said wafer and said circuit can expand beneath said dome portion and escape through said apertures, and
 (e) a protective encapsulating layer of dielectric material bonded to said surface of said cover coat and encapsulating said circuit and at least part of said wafer, and said post extending beyond an outer surface of said device.

3. An electrical heating device comprising:
 (a) a conductive support layer;
 (b) a cover coat of protective, dielectric glass or glass-ceramic material connected to a surface of said support layer;
 (c) printed conductive film circuit applied to a surface of said cover coat said circuit including at least one enlarged area for connection to a terminal;
 (d) a terminal comprising a wafer and a post connected to said wafer with said wafer connected to said area of said circuit, said wafer being sufficiently thin and having a sufficiently large area such that it will float and not sink in said cover coat when said cover coat is in a fluid state, said wafer including a centrally located raised dome portion, said dome portion having a plurality of apertures extending therethrough, and
 (e) a thin encapsulating layer of protective dielectric glass or glass-ceramic material bonded to said surface of said cover coat containing said circuit and encapsulating said circuit and at least a part of said wafer with said post extending beyond an outer surface of said device.

4. An electrical device comprising:
 (a) a substrate;
 (b) a ground coat of glass-ceramic dielectric material on one surface of said substrate;
 (c) a cover coat of glass-ceramic dielectric material on said ground coat, said cover coat material having the property of becoming soft and semi-fluid when heated to a temperature of about 1600° F.;
 (d) a thin film electrically condutcive circuit on said cover coat;
 (e) a terminal connected to said circuit, said terminal comprising a wafer and a post, said wafer being in contact with said circuit and having a thickness of between about 3 and 10 mils;
 (f) said wafer having a sufficiently large area and said terminal having a sufficiently small weight such as to prevent said terminal from sinking through said cover coat when said cover coat is fired at temperatures of about 1600° F.;
 (g) an encapsulating layer of glass-ceramic dielectric material covering said cover coat and said circuit and at least partly covering said wafer, said encapsulating layer having a thickness of between about 4 and 10 mils, said post of said terminal extending through said encapsulating layer and extending beyond the outer surface of said encapsulating layer.

5. The device according to claim 4 including a coating of silver completely covering said wafer.

6. The device according to claim 4 including a coating of silver completely covering said terminal, said silver coating having a thickness of between about 1/20 and 3/4 mil.

7. The device according to claim 4 wherein said wafer includes gas venting passageway means for venting any gas exising between said wafer and said circuit, whereby any such gas can escape from between said wafer and said circuit.

8. The device according to claim 7 including a coating of silver completely covering said wafer.

9. The device according to claim 4 wherein said wafer has a raised dome portion having a plurality of apertures extending therethrough, whereby any gas existing between said wafer and said circuit can freely expand and escape from between said wafer and said circuit.

10. The device according to claim 9 including a coating of silver completely covering said wafer.

11. The device according to claim 10 wherein said substrate in a metal layer having a thickness of between about 1/16" and 1/8".

12. The device according to claim 4 wherein said substrate is a metal layer having a thickness of between about 1/16" and 1/8".

13. The device according to claim 4 including a quantity of conductive cement between said wafer and said circuit, the material of which said cement consists being identical to the material of which said circuit consists.

14. The device according to claim 4 wherein all coats separating said thin film electrically conductive circuit from said substrate have the property of becoming soft and semi-fluid when heated to a temperature of about 1600° F.

15. The device according to claim 4 wherein said thin film electrically conductive circuit has a sufficiently large area and a sufficiently small weight such that it floats on said cover coat when said cover coat is fired at temperatures of about 1600° F.

16. The device according to claim 4 wherein said circuit includes an island of enlarged area, wherein said wafer of said terminal is connected to said island.

17. The device according to claim 4 wherein all coats separating said thin film electrically conductive circuit from said substrate have the property of becoming soft and semi-fluid when heated to a temperature of about 1600° F., wherein said thin film electrically conductive surface has a sufficiently large area and a sufficiently small weight such that it floats on said cover coat when said cover coat is fired at temperatures of about 1600° F., and wherein said circuit includes an island of enlarged area to which said wafer of said terminal is connected.

18. An electrical device comprising:
(a) a cover coat of glass-ceramic dielectric material having the property of becoming soft and semi-fluid at a temperature of about 1600° F.;
(b) a thin film electrically conductive circuit connected to one surface of said cover coat, said circuit having a sufficiently large area and a sufficiently small weight such that it floats on said cover coat when said cover coat it fired at temperatures of about 1600° F.;
(c) a terminal connected to said circuit, said terminal comprising a wafer and a post, said wafer being in contact with said circuit and having a thickness of between about 3 and 10 mils;
(d) said wafer having a sufficiently large area and said terminal having a sufficiently small weight such as to prevent said terminal from sinking through said cover coat when said cover coat is fired at temperatures of about 1600° F.; and
(e) an encapsulating layer of glass-ceramic dielectric material covering said cover coat and said circuit and at least partly covering said wafer, said encapsulating layer having a thickness of between about 4 and 10 mils, said post of said terminal extending through and beyond said encapsulating layer.

19. The device according to claim 18 wherein said terminal is silver plated.

20. The device according to claim 19 wherein said wafer includes passageway means for venting any gas existing between said wafer and said circuit.

21. In an electrical device including a thin film electrically conductive circuit completely encapsulated within a layer of glass-ceramic dielectric material having the property of becoming soft and semi-fluid when heated to a predetermined firing temperature, said circuit having sufficiently large area and sufficiently small weight such that it floats in said layer when said layer is soft and semi-fluid the improvement comprising a terminal connected to said circuit, said terminal comprising a wafer and a post, said wafer being in contact with said circuit and said post extending through said layer and extending beyond the outer surface of said layer, said wafer having a thickness of between 3 and 10 mils, and said wafer having a sufficiently large area and said terminal having a sufficiently small weight such as to prevent the terminal from sinking through said layer when said layer is fired at said predetermined firing temperature.

22. The device according to claim 21 wherein said wafer is silver plated.

23. A terminal comprising a wafer and a post, said wafer having gas venting passageways therein and a thickness of between about 3 and 10 mils and being coated with a layer of silver having a thickness of between about $\frac{1}{20}$ and $\frac{3}{4}$ mil.

24. The terminal according to claim 23 in which said wafer includes a raised dome portion having a plurality of apertures extending therethrough.

25. A method of making an electrical device comprising:
(a) applying a thin film electrically conductive circuit to a surface of a cover coat of glass-ceramic dielectric material, said material having the property of becoming soft and semi-fluid when fired at a temperature of about 1600° F., and said circuit having a sufficiently large area and a sufficiently small weight such that it will float on said cover coat when said cover coat is soft and semi-fluid;
(b) connecting a terminal comprising a wafer and a post to said circuit with said wafer in contact with said circuit, said wafer having a thickness of between about 3 and 10 mils;
(c) applying an encapsulating layer of glass-ceramic dielectric material over and completely covering said circuit and at least partly covering said wafer;
(d) firing said device, after said step of applying said terminal, at a temperature of about 1600° F.; and
(e) preventing said terminal from sinking through said cover coat during said firing step by employing a terminal having a sufficiently small weight and a wafer having a sufficiently large area such that said terminal can float on said cover coat.

26. The method according to claim 25 wherein said connecting step includes the step of employing a wafer coated with a layer of silver having a thickness of between about $\frac{1}{20}$ and $\frac{3}{4}$ mil.

27. The method according to claim 26 wherein said circuit is formed from a conductive silver mix and wherein said connecting step includes the step of applying a layer of said conductive silver mix between said circuit and said wafer.

28. The method according to claim 25 including the step of venting any gas existing between said circuit and said wafer to atmosphere.

29. The method according to claim 25 including the preliminary step of applying said cover coat to a metal substrate having a thickness of between about $\frac{1}{16}$ and $\frac{1}{8}$ inch.

30. In the method of making an electrical device of the type adapted to operate at temperatures up to 1000° F., and comprising a thin film electrically conductive circuit completely encapsulated within a layer of glass-ceramic dielectric material having the property of becoming soft and semi-fluid when fired at a temperature of about 1600° F., said circuit having such area and weight as to float in said layer the improvement comprising: connecting a terminal comprising a wafer and a post in electrical contact with said circuit, with said wafer in contact with said circuit and said post extending through said layer and beyond the outer surface of said layer, and preventing said terminal from sinking through said layer when firing at a temperature of about 1600° F., by floating said terminal in said layer.

31. In the method of connecting an electrical terminal to an electrical device comprising a thin film electrically conductive circuit completely encapsulated within a glass-ceramic dielectric material, wherein said device is subjected to at least one firing step at about 1600° F. after said connecting step, and, wherein said circuit is formed from an electrically conductive silver mix, the improvement comprising connecting a silver plated, metal terminal to said circuit by applying a layer of said silver mix between said circuit and said terminal, and firing said terminal and circuit, after said connecting step, at a temperature of about 1600° F., whereby said silver plating prevents the oxidation of said metal terminal and the formation of a weak bond between said circuit and terminal.

References Cited
UNITED STATES PATENTS

| | | | |
|---|---|---|---|
| 1,140,134 | 5/1915 | Eldred | 174—50.61 |
| 1,321,104 | 11/1919 | Kebler | 174—94 |
| 2,644,066 | 6/1953 | Glynn | 338—329 XR |
| 2,859,321 | 11/1958 | Garaway | 338—255 |

FOREIGN PATENTS 270,301  7/1928  Great Britain.

D. L. CLAY, Primary Examiner

U.S. Cl. X.R.

29—625; 174—50.61; 338—255, 312, 329